United States Patent [19]
Ota et al.

[11] Patent Number: 5,343,349
[45] Date of Patent: Aug. 30, 1994

[54] TAPE CASSETTE WITH ERASURE PREVENTING PLUG HAVING A HEAD PORTION WITH A SLANTED BOTTOM SURFACE

[75] Inventors: Takashi Ota; Osamu Taguchi; Hiromichi Itahashi, all of Miyagi, Japan

[73] Assignee: Sony Corporation, Tokyo, Japan

[21] Appl. No.: 989,654

[22] Filed: Dec. 14, 1992

[30] Foreign Application Priority Data

Dec. 18, 1991 [JP] Japan ................................. 3-334625

[51] Int. Cl.⁵ ............................................. G11B 23/02
[52] U.S. Cl. .................................................... 360/132
[58] Field of Search ..................... 360/132, 60; 242/199

[56] References Cited
U.S. PATENT DOCUMENTS 4,814,923 3/1989 Kawada ............................... 360/132

*Primary Examiner*—A. J. Heinz
*Attorney, Agent, or Firm*—William S. Frommer; Alvin Sinderbrand

[57] ABSTRACT

A tape cassette includes an erasure preventing plug comprising a circular head portion, a first leg portion, a second leg portion having a diameter less than the first leg portion, and a locking projection. A lower surface of the circular head portion where it joins the first leg portion is angled. The outer diameter of the first leg portion where it connects with the lower angled surface of the circular head portion is determined so as to be generally equal to an inner diameter of a coil spring used for biasing the erasure preventing plug when the erasure preventing plug and the coil spring are mounted in a cassette casing when the coil spring is compressed so as to be in contact with the angled lower surface of the circular head portion.

13 Claims, 8 Drawing Sheets

5,343,349

TAPE CASSETTE WITH ERASURE PREVENTING PLUG HAVING A HEAD PORTION WITH A SLANTED BOTTOM SURFACE

BACKGROUND OF THE INVENTION

1. Field of The Invention

The present invention relates generally to a tape cassette including an erasure preventing plug for enabling or disabling a record mode of a playback/recording apparatus into which the tape cassette is inserted.

2. Description of The Prior Art

Recording/playback apparatus utilizing tape cassettes are well known in the art. A tape cassette to be utilized in such apparatus are generally provided with means to selectively enable or disable a record function of the apparatus to allow a user to protect recorded material from accidental erasure or to prevent program material from being recording over accidentally. One such means of enabling/disabling a record mode is providing a tape cassette with an erasure preventing plug. An erasure preventing plug is provided in the cassette body and is selectively movable, generally between two predetermined positions for enabling or disabling recording of the tape cassette.

The arrangement and functioning of a typical, conventional tape cassette erasure preventing plug will be explained hereinbelow with reference to FIGS. 7-9.

First, referring to FIG. 7, a tape cassette 1 includes an upper half 3 and a lower half 4. A circular opening 3h is defined by a generally cylindrical wall portion 3c extending downwardly into a portion of the lower half 4 to contact a circular opening 4h defined by a cylindrical wall portion 4c extending upwardly from the lower half 4. The bottom of the cylindrical wall portion 3c has a first projection 3p formed on one side on a lower surface thereof and the top off the cylindrical wall portion 4c has a second projection 4p formed on one side thereof, a bottom surface of which is vertically offset from the bottom surface of the first projection 3p. Thus, a substantially circular opening is formed through the cassette body, being comprised of opening 3h in communication with opening 4h and having a narrowed portion at a substantially middle portion thereof where the projections 3p and 4p are formed. An erasure preventing plug 5 is provided, rotatable arranged in the openings 3h, 4h such that a head portion 5a thereof is positioned in the opening 3h and a lower end of a leg portion 5d and lock projection 5e thereof is arranged in the opening 4h with a waist portion 5c and an upper part of the leg portion 5d passing through the narrowed portion between the openings 3h, 4h. As can be seen in the drawings, the erasure preventing plug 5 is biased in the upper direction by a coil spring 2 arranged between the top surfaces of the first and second projections 3p, 4p and the lower surface of the head 5a of the erasure preventing plug 5.

According to the arrangement shown in FIG. 7, a detector pin 6 of a video tape recorder, for example, does not contact the bottom surface of the lock projection 5e of the erasure preventing plug 5 and may project fully into the opening 4h, therefore recording on the tape cassette 1 is possible.

FIG. 8 shows an operation for changing the arrangement of the erasure preventing plug 5 so as to disable recording on the tape cassette 1.

Referring to FIG. 8, a screwdriver 7, or other such tool, is inserted into a slot 5r formed in the upper surface of the head 5a of the erasure preventing plug 5. Then, applying downward pressure against the head 5a of the erasure preventing plug 5 against the spring force of the spring 2, the waist 5c and leg 5d of the erasure preventing plug 5 are pushed downward and the lock projection 5e is separated from contact with the lower surface of the second projection 4p. Next, the screwdriver 7 is turned to rotate the head 5a of the erasure preventing plug 5 180° via the slot 5r such that the lock projection 5e is rotated so as to project in the opposite direction than before rotation of the erasure preventing plug 5. Then, downward pressure on the erasure preventing plug 5 is released by removal of the screwdriver 7 and the spring 2 is active to push head 5a of the the erasure preventing plug 5 in the upward direction, bringing the lock projection 5e into contact with the first projection 3p which is disposed on a horizontal plane which is lower than that of the second projection 4p, thus upward movement of the erasure preventing plug 5 is restricted to less that that permitted before rotation thereof.

Referring now to FIG. 9, in this state, when the tape cassette 1 is inserted into the video tape recorder (VCR), for example, the detector pin 6 is contacted by the lower surface of the lock projection 5e and the VCR is prevented from entering a record mode and accidental erasure of program material recorded on the magnetic tape (not shown) of the tape cassette 1 is prevented.

However, according to this, as seen in FIG. 10, a certain amount of play Ar is present in the above-described arrangement. That is, a degree of lateral movement of the leg portion 5d may occur during adjustment of the erasure preventing plug 5 which may cause the lock projection 5e to become jammed on a side edge of the first projection 3p, for example. Thus, malfunction of the erasure preventing plug 5 may easily occur and reliability of the tape cassette is compromised. Further, during automated assembly of the tape cassette, the erasure preventing plug is held to the upper half while the upper half 3 is joined to the lower half 4, according to the above-described arrangement, the erasure preventing plug may easily become dislodged from the upper half 3 during assembly causing an increase in faulty assemblies during manufacturing.

For preventing these types of problems, an erasure preventing plug has been proposed which is disclosed in Japanese Utility Model application First Publication 62-12976, the arrangement of which is shown in FIG. 11.

As seen in the drawing, the erasure preventing plug 5 comprises a head 5a, including a slanted lower surface 5f, a waist 5c of a first diameter, a leg portion 5d of a second diameter, less that the first diameter, a lock projection 5e projecting substantially perpendicular to the axial direction of the leg portion 5d, and a slot 5r formed in the top surface of the head 5a for engaging a tool for rotating the erasure preventing plug 5. As may be seen in the drawing, a distance H1 present from the lower surface of the head 5a to the bottom of the leg 5d on a first side, from which the lock projection 5e is projected, is less that a distance H2 from the lower surface of the head 5a to the bottom of the leg 5d on a second side from which the lock projection 5e is not projected.

Operation of the above-described improved erasure preventing plug 5 will be explained hereinbelow with reference to FIGS. 12-16.

First, referring to FIG. 12, downward pressure is applied to the erasure preventing plug 5 in the direction of the arrow shown in the drawing, then, as seen in FIG. 13, as the slanted lower surface 5f of the head 5a compresses the coil spring 2, a large spring force is applied to the right side of the head 5a of the erasure preventing plug 5 than to the left. Therefore, in this 'unengaged position' the plug lists slightly to the left, as seen in FIG. 13, and contact between the leg portion 5d and the projection 3p is prevented. Then, as seen in FIG. 14, the erasure preventing plug 5 is rotated approximately 180°, for effecting erasure prevention, or an 'engaged position', and, in FIG. 15, after rotation of the erasure preventing plug 5, in a compressed condition of the coil spring 2, a larger spring force is applied to the left side of the head 5a of the erasure preventing plug 5 than to the right, causing the pin to thus list to the right. According to this, pressure is maintained in the contact between the projection 3p and the lock projection 5e which can resist vibration and assure positioning of the erasure preventing plug 5. This feature facilitates automated assembly of the cassette.

However, there is a drawback in the above arrangement, as best seen in FIG. 16. That is, the coil spring 2 has a certain amount of play within the opening 3h in the direction of the arrow Arr of FIG. 16, in an unengaged position, similar to that of FIG. 13, the spring force exerted on the right side of the lower surface of the head 5a is greater than that exerted on the left side, this causes the coil spring to move to the extreme left of the opening 3h, pushed, as it were, by its own spring force. In this state an upper end 2u off the coil spring can extend beyond the periphery of the head 5a of the erasure preventing plug 5. If the erasure preventing plug 5 is operated in this condition separation of the end 2u of the spring and the head 5a off the erasure preventing plug 5 is worsened and the mechanical reliability of the mechanism is degraded by distortion of the coil spring 2 etc.

Thus, improvement of an erasure preventing plug mechanism for a tape cassette housing has been required.

SUMMARY OF THE INVENTION

It is therefore a principal object of the present invention to overcome the drawbacks of the prior art.

It is a Further object of the present invention to provide tape cassette including an erasure preventing plug which is not susceptible to mechanical instability during repeated use and in which separation of an end of a coil spring from a lower surface of a head of the erasure preventing plug is prevented.

In order to accomplish the aforementioned and other objects, a tape cassette is provided comprising: an upper casing having a first circular opening defined therethrough, a first projecting portion being attached to one side of a downwardly projecting cylindrical wall defining the first circular opening; a lower casing having a second circular opening defined therethrough, a second projecting portion being attached at a position on an upwardly extending cylindrical wall, defining the second circular opening, substantially opposite the one side; an erasure preventing plug positioned in the first circular opening, the erasure preventing plug comprising a circular head portion having a first diameter and having a slanted bottom surface, a first leg portion extending from the slanted bottom surface and having a second diameter less than the first diameter, a second leg portion having a third diameter less than the second diameter, a locking projection extending substantially perpendicular to the second leg portion, the locking projection engageable with the first projecting portion at a first operational position thereof and with the second projecting portion at a second operational position thereof; and, a coil spring arranged within the first cylindrical opening around the first and second leg portions of the erasure preventing plug, an inner diameter of the coil spring being determined so as to be slightly greater than the diameter of the first leg portion such that, when downward pressure is applied to the head portion of the erasure preventing plug and an upper side of the spring becomes wholly in contact with the slanted lower surface of the head portion, the inner diameter of the coil spring becomes substantially equal to a diameter of a portion where said first leg portion connects with said slanted bottom surface of said circular head portion.

According to another aspect of the present invention, an erasure preventing mechanism for a tape cassette is provided, comprising: a circular opening formed in one half of a casing of the tape cassette, a projection being formed at a lower side of the opening: a coil spring, disposed in the opening: and an erasure preventing plug: wherein the erasure preventing plug comprises: a circular head portion, a diameter of the circular head portion being slightly less than a diameter of the circular opening; a first leg portion, extending from from the circular head portion in the same axial direction; a second leg portion, having a diameter smaller than the first leg portion and extending therefrom in the same axial direction; a locking projection, extending substantially at a right ankle from one side of the second leg portion, the locking projection being engageable with the projection at the lower side of the opening;the head portion having an angled lower surface, declining toward the of the second leg portion from which the locking projection extends, a diameter of the first leg portion being determined such that a linear distance from a lowest point at which the first leg portion meets the angled lower surface of the head portion to a highest point at which the first leg portion meets the angled lower surface of the head portion, substantially equals an inner diameter of the coil spring.

In addition, according to a further aspect of the present invention, a process of assembling a tape cassette is provided, comprising the seeps of: inserting an erasure plug into a circular opening provided in a first half of a cassette casing, a coil spring being disposed around the erasure preventing plug substantially coaxially therewith; applying downward pressure to the erasure preventing plug such that an upper side of the coil spring contacts a lower surface of a head portion of the erasure preventing plug; depressing the erasure preventing plug so that a locking projection thereof is lower than the bottom of a projection formed at a lower side of the opening; rotating the erasure preventing plug until contact is made between an upper surface of the locking projection and a lower surface of the projection formed at the lower side of the opening; and releasing downward pressure on the erasure preventing plug; wherein the erasure preventing plug comprises a circular head portion having a first diameter and having a slanted bottom surface, a first leg portion extending from the slanted bottom surface and having a second diameter less than the first diameter, a second leg portion having a third diameter less than the second diameter, the locking projection extending substantially perpendicular to the second leg portion; and wherein an inner diameter of the coil spring is determined so as to be slightly greater than the diameter of the first leg portion such that, when the downward pressure is applied to the head portion of the erasure preventing plug such that an upper side of the spring becomes wholly in contact with the slanted lower surface of the head portion, the inner diameter of the coil spring becomes substantially equal to a diameter of a portion where said first leg portion connects with said slanted bottom surface of said circular head portion.

DESCRIPTION OF THE PREFERRED EMBODIMENT

Figure 1:
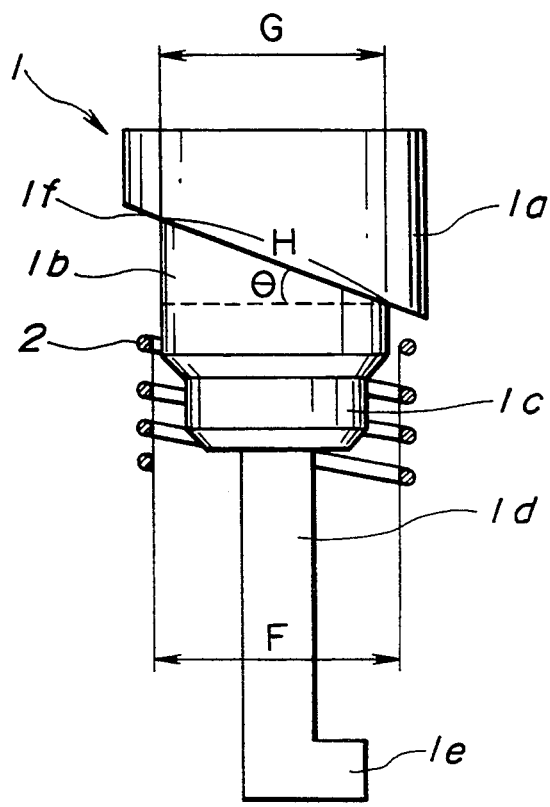
FIG. 1 is a side view of an erasure preventing plug according to a first embodiment of the invention.

Referring now to the drawings, particularly to FIG. 1, a tape cassette according to the invention includes an erasure preventing plug 1 having a circular head 1a, a first leg portion 1b, a second leg portion 1d, with a waist portion 1c between the first and second leg portions 1b and 1d and a locking projection 1e extending from the second leg portion 1d.

The head portion 1a of the erasure preventing plug 1 has a slanted bottom surface 1f where the bottom surface joins the first leg portion 1b. The slanted bottom surface 1f is slanted at a given angle $\theta$ relative the horizontal, as shown by a dotted line in FIG. 1. The declining direction of the angle $\theta$ is generally to the same side of the erasure preventing plug 1 as that from which the locking projection 1e extends. Further, the contour at which the first leg portion 1b projects from the slanted bottom surface 1f of the head portion 1a has a given diametric length H, and an inner diameter F of a coil spring 2 operatively associated with tile erasure preventing plug 1 is generally equal to the length H. In other words, the diameter of the first leg portion 1b is determined such that, the linear distance H, from where the first leg portion 1b extends from the lower surface if at the lowest side of the angle $\theta$ to a point on the opposite side of the first leg portion where it extends from the lower surface 1f at the highest side of the angle $\theta$ will be substantially equal to the diameter F of the coil spring 2. The diameter G of the first leg portion may be defined as $H \cdot \cos \theta$.

However, the diameter F may be determined so as to be slightly larger than the diameter G of the first leg portion. In addition a diameter of the waist portion 1c is established so as to be less than that of the first leg portion and greater than that of the second leg portion.

Figure 2:
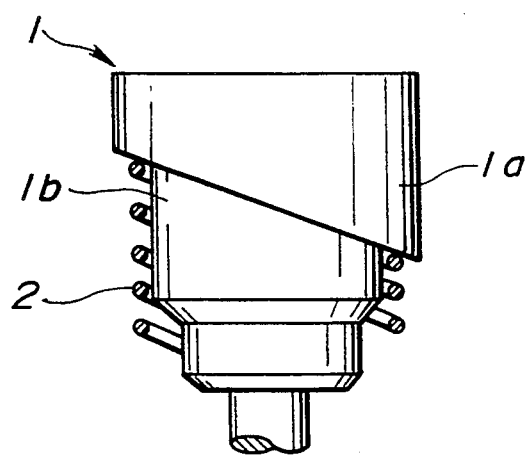
FIG. 2 is an enlarged view of a head portion of the erasure preventing plug of FIG. 1.

As can be seen in FIG. 2, when the spring 2 is contacted with the slanted bottom surface 1f of the head portion 1a of the erasure preventing plug 1, the inner diameter F becomes substantially the same as H and even as the spring is compressed by downward pressure on the erasure preventing plug 1, separation of an upper portion of the spring from the periphery of the slanted lower surface 1f of the head portion 1a is avoided.

Hereinbelow, an assembly operation for a tape cassette utilizing an erasure preventing plug 1 according to the above-described embodiment will be described in detail with reference to FIGS. 3–6.

Figure 3:
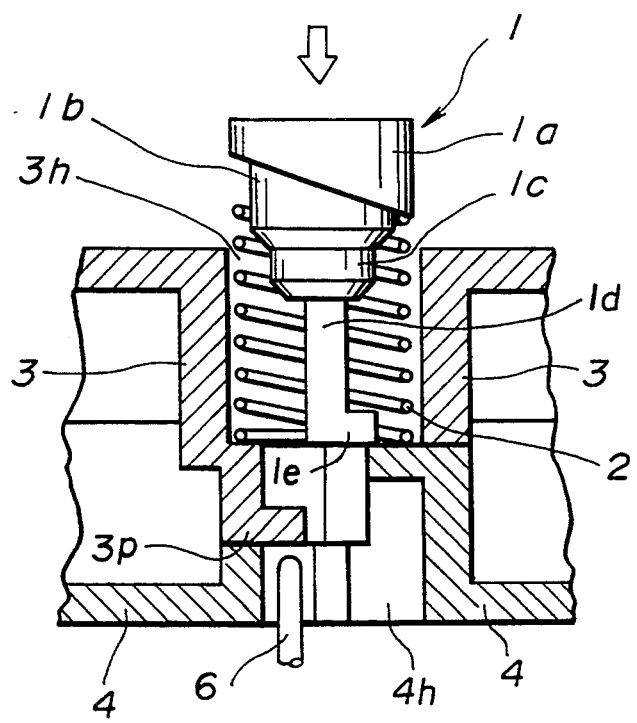
FIG. 3 shows the erasure preventing plug of FIG. 1 at one step during an assembly process of a tape cassette according to the invention.
Figure 4:
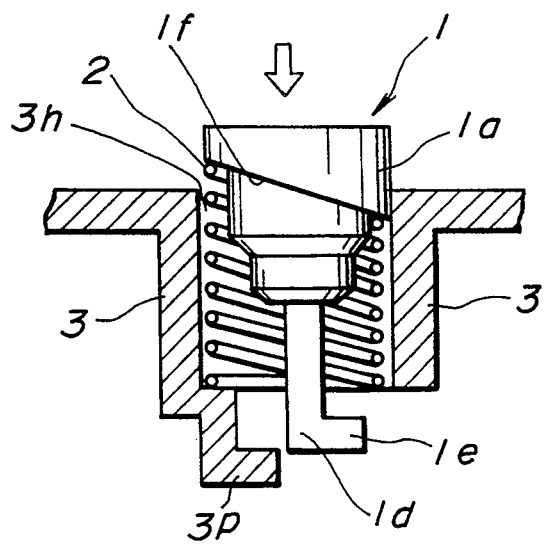
FIG. 4 shows the erasure preventing plug of FIG. 1 at another step of the assembly process of the tape cassette according to the invention.

First, referring to FIG. 3, the erasure preventing plug 1 is inserted into the opening 3h along with the coil spring 2 which is disposed around the erasure preventing plug 1, substantially coaxial therewith. Then, as seen in FIG. 4, downward pressure is applied to the erasure preventing plug 1, this causes an upper side of the coil spring 2 to contact the slanted lower surface 1f of the head portion 1a of the erasure preventing plug 1. As may be appreciated, in this state, the coil spring 2 applies greater spring force to the right side of the slanted lower surface 1f of the head 1a than to the left side thereof, causing the erasure preventing plug 1 to list slightly to the left and thus collision of the second leg portion 1d with the projection 3p of the upper casing during assembly is prevented. Then, in this condition, the inner diameter of the coil spring becomes substantially equal to the diametric length H along which the diameter of the first leg portion 1b contacts the slanted lower surface 1f of the head portion 1a, and separation of the periphery of the upper portion of the coil spring 2 from the periphery of the head portion 1a of the erasure preventing plug 1 is not possible.

Figure 5:
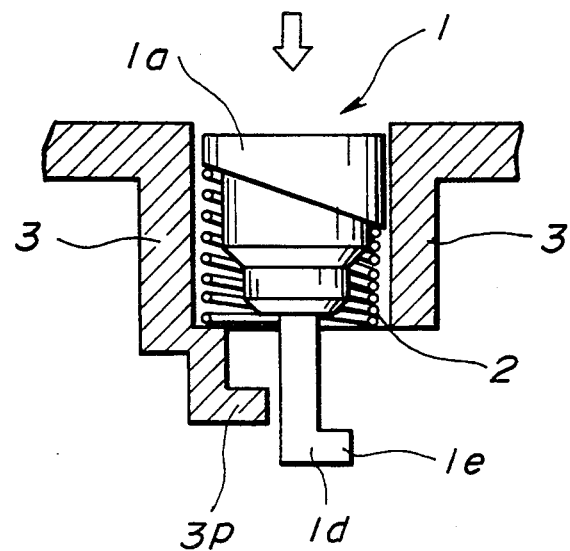
FIG. 5 shows the erasure preventing plug of FIG. 1 at a further step of the assembly process of the tape cassette according to the invention.
Figure 6:
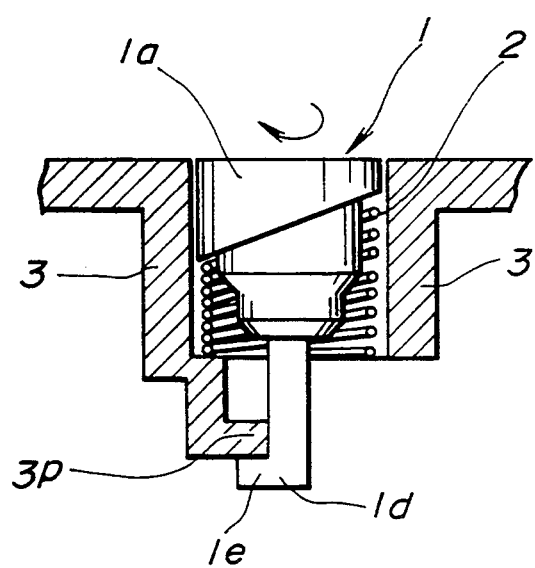
FIG. 6 shows the erasure preventing plug of FIG. 1 at a final step of the assembly process of the tape cassette according to the invention.
Figure 7:
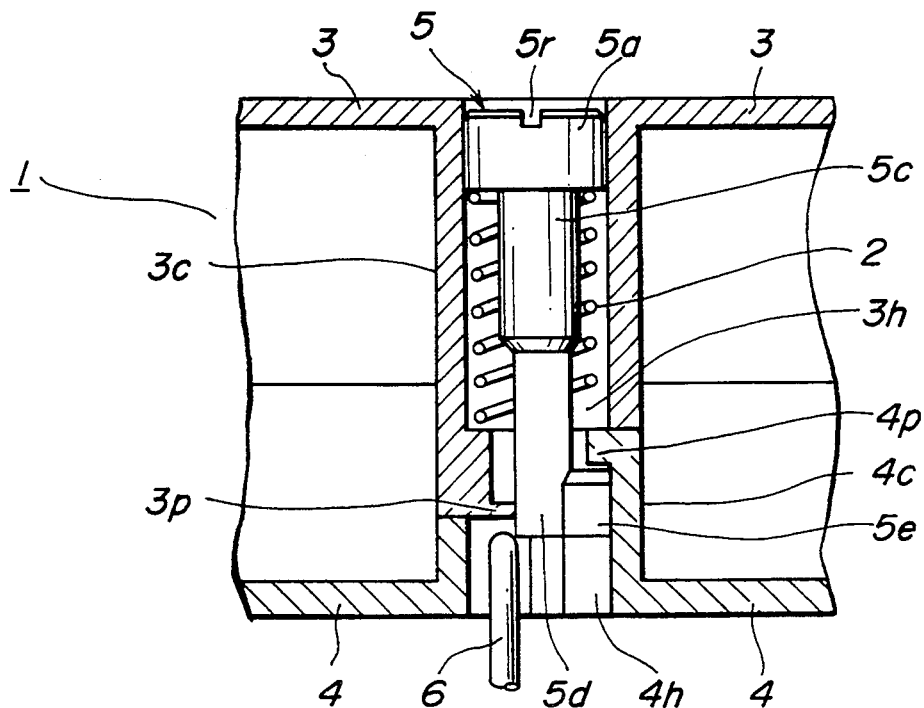
FIG. 7 is an cross-sectional view explaining operation of a first embodiment of a conventional erasure preventing plug.
Figure 8:
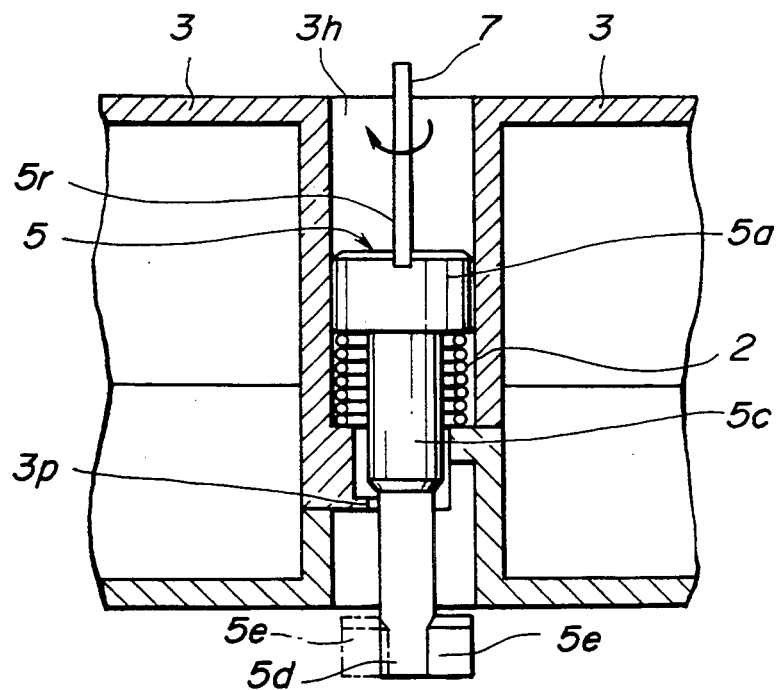
FIG. 8 is a cross-sectional view of an engaging operation of the conventional erasure preventing plug of FIG. 7.
Figure 9:
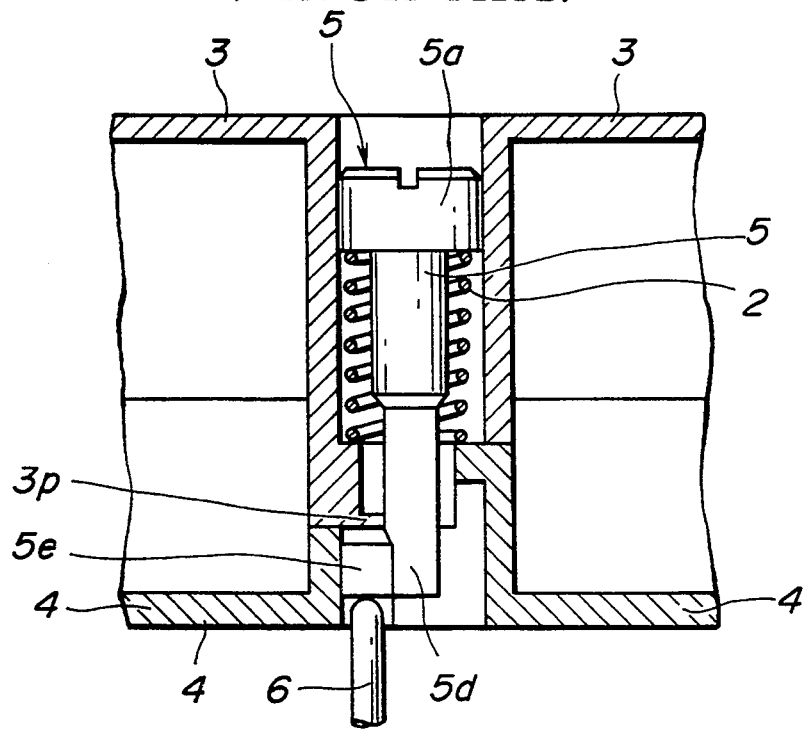
FIG. 9 shows the conventional erasure preventing plug of FIG. 7 in an 'engaged' position.
Figure 11:
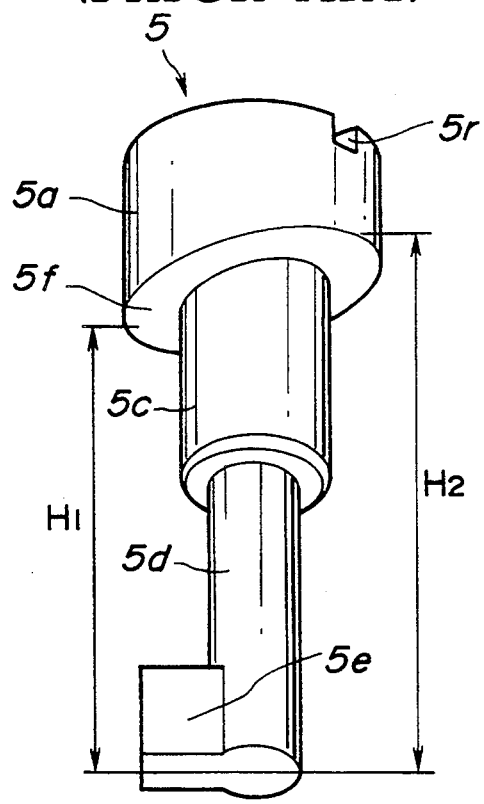
FIG. 11 shows an alternative embodiment of an erasure preventing plug for a tape cassette.
Figure 10:
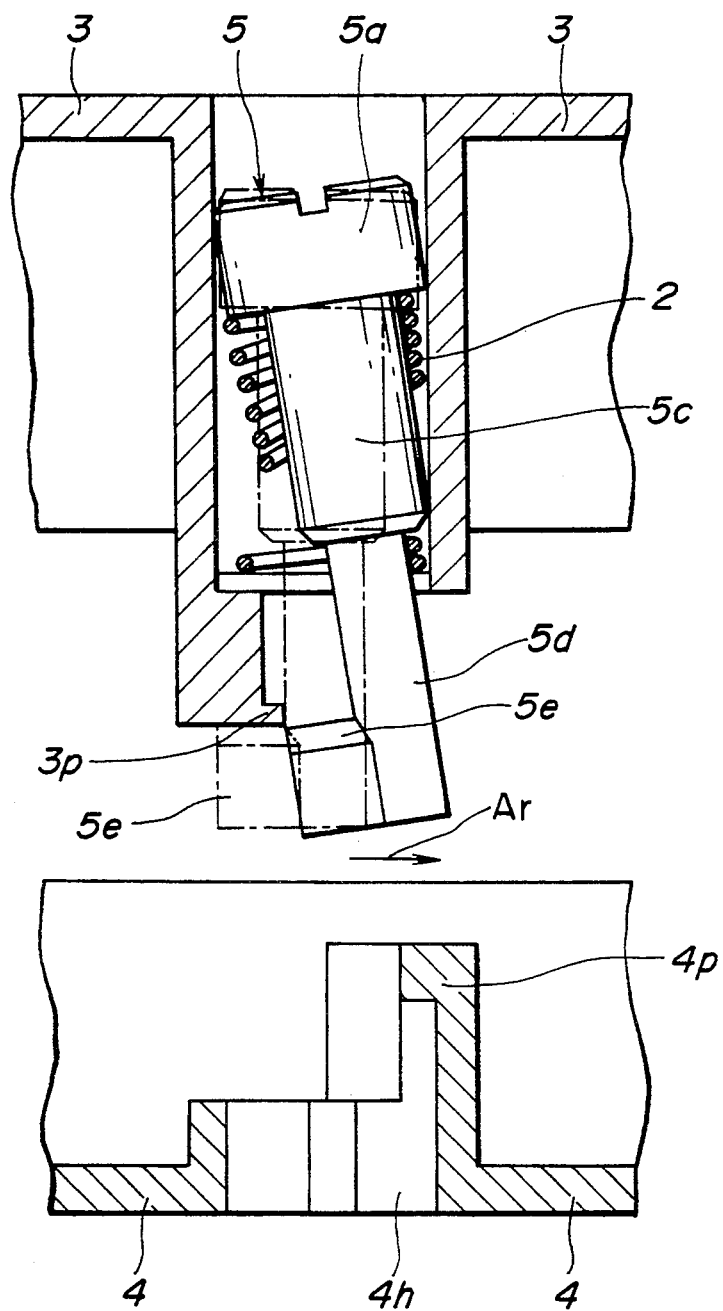
FIG. 10 is a cross-sectional view for explaining a drawback of the conventional erasure preventing plug of FIG. 7.
Figure 12:
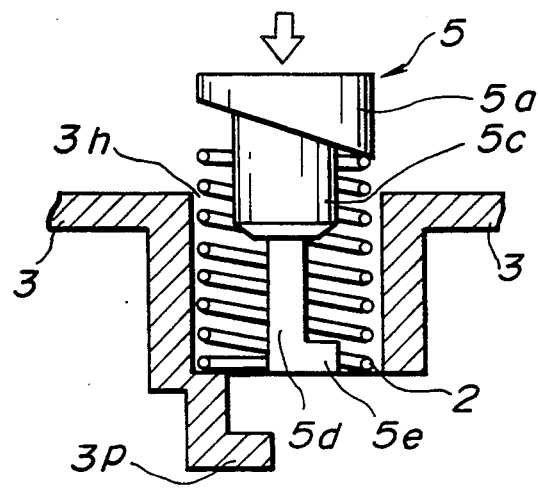
FIG. 12 shows a step in an assembly process of a tape cassette utilizing the erasure preventing plug of FIG. 11.
Figure 13:
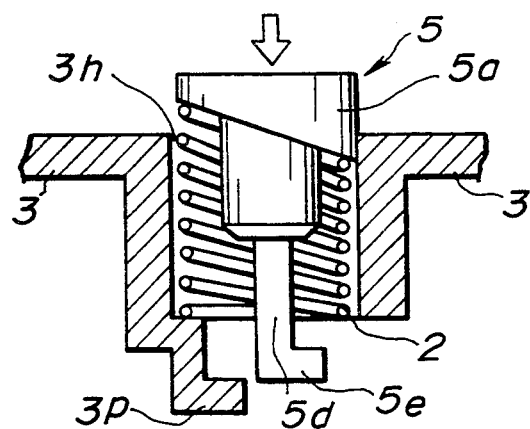
FIG. 13 shows a step in an assembly process of a tape cassette utilizing the erasure preventing plug of FIG. 11.
Figure 14:
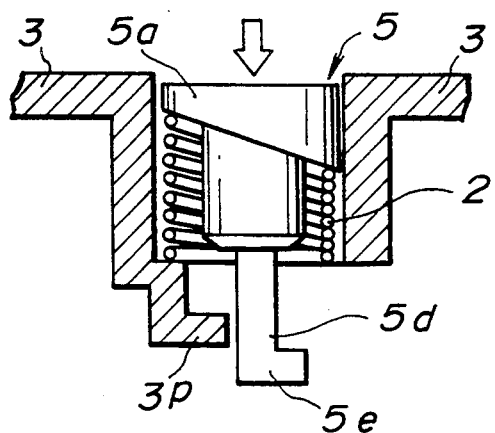
FIG. 14 shows another step in the assembly process of the tape cassette utilizing the erasure preventing plug of FIG. 11.
Figure 15:
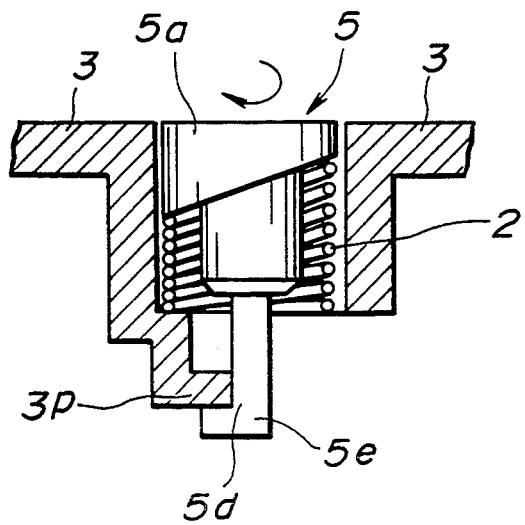
FIG. 15 shows a further step in the assembly process of the tape cassette utilizing the erasure preventing plug of FIG. 11.
Figure 16:
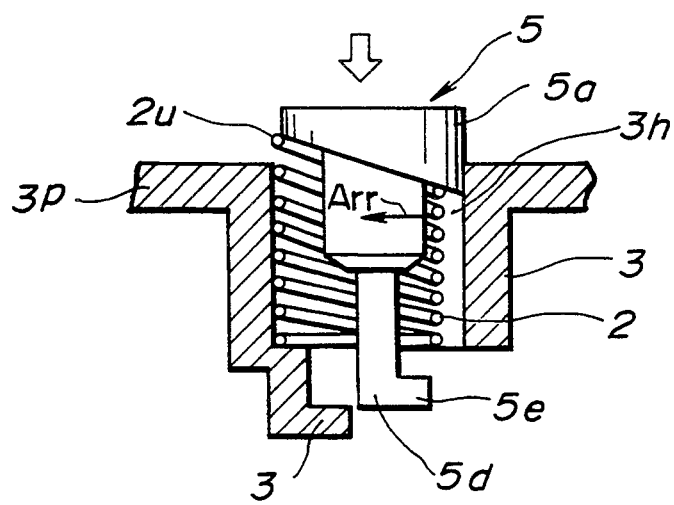
FIG. 16 is a cross-sectional view for explaining a drawback of the alternative embodiment of an erasure preventing plug shown in FIG. 11.

Then, referring to FIG. 5, when the erasure preventing plug 1 is is fully depressed such that the locking projection 1e is lower than the bottom of the projection 3p of the upper half 3, it is then rotated 180°, as seen in FIG. 6. In this state contact is made between the upper surface of the locking projection 1e and the lower surface of the projection 3p of the upper half and downward pressure on the erasure preventing plug 1 is released. The spring force of the coil spring 2 urges the erasure preventing plug 1 in an upward direction, and due to the rotation of the erasure preventing plug 1, greater spring force is now exerted on the left side of the head portion 1a causing the erasure preventing plug 1 to list slightly to the right, establishing secure engagement between the locking projection 1e and the projection 3p of the upper half.

Thus, according to the present invention, an erasure preventing plug 1 for a tape cassette includes a head portion 1a having a slanted bottom surface 1f slanted at an angle in relation to a leg portion 1b extending from the slanted bottom surface 1f, with the inner diameter of the coil spring 2 disposed around the erasure preventing plug 1 being determined so as to substantially equal a diametric length H of the slanted surface where it contacts the first leg portion 1b. According to such construction, the erasure preventing plug 1 can be smoothly inserted into the opening 3h of the upper half of the cassette and secure engagement of the locking projection 1e of the erasure preventing plug 1 and the projection 3p of the upper half 3 can be assured. Therefore, automated assembly of the cassette can be easily carried out without occurrence of misassembly of, or damage to, the erasure preventing plug mechanism.

Further, the above-described embodiment has been described in terms of the general principles of the invention but may be implemented with specific dimensions such as given below for purposes of example.

That is, the inner diameter F of the coil spring 2 may be established as 7.5 mm, the slant angle of the slanted bottom surface 1f being 15.5°, and the diametric length H being 7.26 mm. The diameter G being approximately 7.0 mm therefore. Alternatively, the inner diameter F may be established as 7.5 mm and the slant angle of the slanted bottom surface 1f may be 21.0°, with the diametric length H being 7.5, thus again, a diameter G of the first leg portion 1b is approximately 7.0 mm.

In addition, although the first embodiment is drawn to an erasure preventing plug for a video tape cassette, the erasure preventing plug mechanism of the invention may be utilized in any type of tape cassette for any application.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A tape cassette comprising:
   an upper casing including a first circular opening having a first cylindrical wall extending therethrough, said first cylindrical wall having a first projecting portion attached to one side thereof;
   a lower casing including a second circular opening having a second cylindrical wall extending therethrough, said second cylindrical wall having a second projecting portion attached at a position thereof substantially opposite said one side of said first cylindrical wall;
   an erasure preventing plug arranged in said first and second circular openings, said erasure preventing plug including a head portion adapted to receive a pressure applied by an operator and having a first diameter and a bottom surface which is slanted at a predetermined angle $\theta$ relative to a horizontal reference line, a first leg portion having a second diameter $D_2$ which is less than said first diameter and extending from the slanted bottom surface such that said first leg has a diametric length $H = D_2/\cos\theta$ at the location where said first leg extends from said slanted bottom surface, a second leg portion having a third diameter less than said second diameter $D_2$, and a locking projection extending substantially perpendicular to said second leg portion, said locking projection engageable with said first projecting portion at a first operational position thereof and with said second projecting portion at a second operational position thereof; and
   a coil spring arranged around said first and second leg portions of said erasure preventing plug within said first cylindrical opening, said coil spring having an upper portion thereof and an inner diameter substantially equal to said diametric length H, said upper portion of said coil spring contacting said slanted bottom surface and contained within a periphery defined by said slanted bottom surface when said pressure is applied to said head portion of said erasure preventing plug.

2. A tape cassette as in claim 1, wherein said erasure preventing plug further includes a waist portion formed between said first and second leg portions and having a diameter less than said second diameter $D_2$ of said first leg portion and greater than said third diameter of said second leg portion.

3. A tape cassette as in claim 1, wherein an upper surface of said head portion of said erasure preventing plug includes a groove, said groove being adapted for engagement with a tool for changing the operational position of said erasure preventing plug.

4. A tape cassette as in claim 1, wherein either of said first or second operational positions is established by rotating said erasure preventing plug approximately 180 degrees from the other of said first and second operational positions.

5. A tape cassette as in claim 1, wherein said first projecting portion includes an L-shaped projection attached to said one side of said first cylindrical wall of said first circular opening and said second projecting portion includes an inverted L-shaped projection attached at said position on said second cylindrical wall of said second circular opening substantially opposite said one side of said first cylindrical wall.

6. A tape cassette as in claim 5, wherein said locking projection engages a bottom surface of said L-shaped projection of said upper casing at said first operational position thereof and a lower surface of an upper portion of said inverted L-shaped projection of said lower casing at said second operational position thereof.

7. A tape cassette as in claim 1, wherein said head portion, said first leg portion and said second leg portion of said erasure preventing plug are integrally formed.

8. An erasure preventing mechanism for a tape cassette having a casing, said mechanism comprising:

an opening formed in one half of said casing of said tape cassette, said opening having a projection formed at a lower side thereof;

an erasure preventing plug arranged in said opening, said erasure preventing plug including a head portion, having a diameter slightly less than a diameter of said opening and having a lower surface which is slanted so as to have a predetermined angle $\theta$ relative to a horizontal reference line; a first leg portion having a first diameter $D_1$ which is less than the diameter of said head portion and extending from the slanted lower surface such that said first leg portion has a diametric length $H = D_1/\cos \theta$ at the location where said first leg portion extends from said slanted lower surface; a second leg portion having a second diameter smaller than said first diameter $D_1$; and a locking projection extending from one side of said second leg portion at an angle of approximately 90 degrees, said locking projection being engageable with said projection at said lower side of said opening; said slanted lower surface of said head portion declining toward said one side of said second leg portion from which said locking projection extends; and a coil spring arranged around said first leg portion within said opening, said coil spring having an inner diameter substantially equal to said diametric length H.

9. An erasure preventing mechanism as in claim 8, wherein said erasure preventing plug further includes a waist portion formed between said first and second leg portions and having a diameter less than said first diameter $D_1$ of said first leg portion and greater than said second diameter of said second leg portion.

10. An erasure preventing mechanism as in claim 8, wherein an upper surface of said head portion of said erasure preventing plug includes a groove, said groove being adapted for engagement with a tool for changing an operational position of said erasure preventing plug.

11. An erasure preventing mechanism as in claim 8, wherein said head portion, said first leg portion, said second leg portion and said locking projection of said erasure preventing plug are integrally formed.

12. A method for producing and assembling an erasure preventing mechanism for a tape cassette having a casing, said method comprising the steps of:

forming an opening having a diameter in one half of said casing of said tape cassette and forming a projection at a lower side of said opening;

forming an erasure preventing plug including a head portion having a first diameter slightly less than the diameter of said opening and having a lower surface which is slanted so as to have a predetermined angle $\theta$ relative to a horizontal reference line, a first leg portion having a second diameter D2 which is less than said first diameter and extending from the slanted lower surface such that said first leg portion has a diametric length $H = D2/\cos \theta$ at the location where said first leg portion extends from said slanted lower surface, a second leg portion having a third diameter smaller than said second diameter, and a locking projection extending substantially perpendicular to said second leg portion;

arranging said erasure preventing plug within said opening with a coil spring having an upper portion thereof and an inner diameter substantially equal to said diametric length H around said first leg portion of said erasure preventing plug;

applying pressure to said head portion of said erasure preventing plug so that said locking projection is lower than a lower surface of said projection formed at said lower side of said opening, said upper portion of said coil spring contacting said slanted lower surface and being contained within a periphery defined by said slanted lower surface when said pressure is applied to said head portion;

rotating said erasure preventing plug until said locking projection is aligned with said projection formed at said lower side of said opening; and releasing said pressure so as to cause an upper surface of said locking projection to contact said lower surface of said projection formed at said lower side of said opening.

13. A method as in claim 12, further including the step of joining said first half of said casing to a corresponding second half thereof.

* * * * *